United States Patent
Ramkumar et al.

(10) Patent No.: US 9,287,954 B2
(45) Date of Patent: Mar. 15, 2016

(54) SYSTEMS AND METHODS FOR TRANSMIT ANTENNA SWITCHING

(71) Applicant: QUALCOMM Incorporated, San Diego, CA (US)

(72) Inventors: Vasanth Kumar Ramkumar, San Diego, CA (US); Srinivasan Rajagopalan, San Diego, CA (US); Sagar Kakade, San Diego, CA (US); Deepak Krishnamoorthi, San Diego, CA (US); Hongbo Yan, Vista, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/500,168

(22) Filed: Sep. 29, 2014

(65) Prior Publication Data
US 2015/0094003 A1    Apr. 2, 2015

Related U.S. Application Data

(60) Provisional application No. 61/884,294, filed on Sep. 30, 2013.

(51) Int. Cl.
*H04B 7/02* (2006.01)
*H04B 7/06* (2006.01)

(52) U.S. Cl.
CPC ............ *H04B 7/0608* (2013.01); *H04B 7/0604* (2013.01)

(58) Field of Classification Search
USPC .......................... 455/101, 103, 129; 375/299
See application file for complete search history.

(56) References Cited

U.S. PATENT DOCUMENTS

| | | | |
|---|---|---|---|
| 2010/0215111 | A1 | 8/2010 | Filipovic et al. |
| 2011/0306383 | A1* | 12/2011 | Lee ...................... H04B 7/0691 455/522 |
| 2013/0039173 | A1 | 2/2013 | Ehsan et al. |
| 2013/0039286 | A1 | 2/2013 | Larsson et al. |
| 2013/0308476 | A1 | 11/2013 | He et al. |
| 2014/0199952 | A1 | 7/2014 | Sandhu et al. |
| 2014/0233665 | A1 | 8/2014 | Clevorn et al. |
| 2014/0341125 | A1* | 11/2014 | Dayal ...................... H04B 1/44 370/329 |

FOREIGN PATENT DOCUMENTS

| | | |
|---|---|---|
| JP | 2011147064 A | 7/2011 |
| WO | 2012002851 A1 | 1/2012 |

OTHER PUBLICATIONS

International Search Report and Written Opinion—PCT/US2014/058405—ISAEPO—Jan. 8, 2015.

* cited by examiner

*Primary Examiner* — Nguyen Vo
(74) *Attorney, Agent, or Firm* — Austin Rapp & Hardman

(57) ABSTRACT

A method for antenna switching is described. The method includes transmitting using a first antenna. The method also includes determining that a trigger occurs to switch to transmitting using a second antenna. The trigger is based on a combination of a physical uplink shared channel (PUSCH) maximum transmit power level (MTPL) counter and a physical uplink control channel (PUCCH) MTPL counter. The method further includes switching to transmitting using the second antenna based on the determination.

30 Claims, 10 Drawing Sheets

200

202 — Transmit using a first antenna

204 — Determine whether to switch to transmitting using a second antenna based on a combination of a PUSCH MTPL counter and a PUCCH MTPL counter 206 — Switch to transmitting using the second antenna

SYSTEMS AND METHODS FOR TRANSMIT ANTENNA SWITCHING

RELATED APPLICATIONS

This application is related to and claims priority from U.S. Provisional Patent Application Ser. No. 61/884,294, filed Sep. 30, 2013, for "Antenna Switch for TX Diversity Based on PUCCH MTPL", and expressly incorporated by reference herein.

TECHNICAL FIELD

The present disclosure relates generally to electronic devices. More specifically, the present disclosure relates to systems and methods for systems and methods for transmit (TX) antenna switching.

BACKGROUND

Wireless communication systems are widely deployed to provide various types of communication content such as voice and data. Typical wireless communication systems may be multiple-access systems capable of supporting communication with multiple users by sharing available system resources (e.g., bandwidth, transmit power, and the like). Examples of such multiple-access systems may include code division multiple access (CDMA) systems, time division multiple access (TDMA) systems, frequency division multiple access (FDMA) systems, orthogonal frequency division multiple access (OFDMA) systems, and the like. Additionally, the systems can conform to specifications such as third generation partnership project (3GPP), 3GPP2, 3GPP long-term evolution (LTE), LTE Advanced (LTE-A), etc.

Generally, wireless multiple-access communication systems may simultaneously support communication for multiple mobile devices. Each mobile device may communicate with one or more base stations via transmissions on forward and reverse links. The forward link (or downlink) refers to the communication link from base stations to mobile devices, and the reverse link (or uplink) refers to the communication link from mobile devices to base stations.

Mobile devices may support multiple antennas. For example, when conditions deteriorate on one antenna, a mobile device may switch to another antenna. Antenna switching may be based on receiver performance. However, in some scenarios, the receiver (RX) performance may not be sufficient to determine when to switch a transmit (TX) antenna. Therefore, systems and method for TX antenna switching may be beneficial.

SUMMARY

A method for antenna switching is described. The method includes transmitting using a first antenna. The method also includes determining that a trigger occurs to switch to transmitting using a second antenna. The trigger is based on a combination of a physical uplink shared channel (PUSCH) maximum transmit power level (MTPL) counter and a physical uplink control channel (PUCCH) MTPL counter. The method further includes switching to transmitting using the second antenna based on the determination.

The trigger may occur when a ratio of the combined MTPL counters over a total number of uplink subframes within a decision period is greater than a MTPL switching threshold. The decision period may be approximately 640 ms and the MTPL switching threshold may be approximately 50%.

The PUSCH MTPL counter may be incremented when transmit (TX) power of a PUSCH subframe is greater than or equal to the MTPL. The PUSCH MTPL counter may be incremented when TX power of a PUCCH subframe is greater than or equal to the MTPL.

The trigger may occur when a reference signal received power (RSRP) of the first antenna and a RSRP of the second antenna are both greater than a MTPL gating threshold.

An antenna switch may switch between the first antenna and the second antenna. The antenna switch may be a type 1 antenna switch where both a primary receiver and a diversity receiver can be switched. The antenna switch may be a type 2 antenna switch where only a primary receiver and a transmitter can switch between two antennas.

The trigger may also be based on a RSRP. The method may further include performing a switchback to the first antenna if the RSRP delta drops by more than a RSRP high threshold on the second antenna.

The method may also include performing a switchback to the first antenna when a transmit power control (TPC) command causes the TX power for the second antenna to rise above a switchback power threshold. The switchback power threshold may be approximately 10 decibels.

The method may also include performing a switchback to the first antenna if a MTPL count on the second antenna is greater than the MTPL count of the first antenna plus a switchback MTPL threshold. The switchback MTPL threshold may be approximately 30%.

A wireless communication device for antenna switching is also described. The wireless communication device includes a processor, memory in electronic communication with the processor, and instructions stored in the memory. The instructions are executable by the processor to transmit using a first antenna. The instructions are also executable to determine that a trigger occurs to switch to transmitting using a second antenna. The trigger is based on a combination of a PUSCH MTPL counter and a PUCCH MTPL counter. The instructions are further executable to switch to transmitting using the second antenna based on the determination.

An apparatus for antenna switching is also described. The apparatus includes means for transmitting using a first antenna. The apparatus also includes means for determining that a trigger occurs to switch to transmitting using a second antenna, wherein the trigger is based on a combination of a PUSCH MTPL counter and a PUCCH MTPL counter. The apparatus further includes means for switch to transmitting using the second antenna based on the determination.

A computer-program product for antenna switching is also described. The computer-program product includes a non-transitory computer-readable medium having instructions thereon. The instructions include code for causing a wireless communication device to transmit using a first antenna. The instructions also include code for causing the wireless communication device to determine that a trigger occurs to switch to transmitting using a second antenna. The trigger is based on a combination of a PUSCH MTPL counter and a PUCCH MTPL counter. The instructions further include code for causing the wireless communication device to switch to transmitting using the second antenna based on the determination.

DETAILED DESCRIPTION

A wireless communication device may include multiple antennas. In some configurations, antenna switching diversity may be used to improve receive (RX) and transmit (TX) performance. For example, a wireless communication device may switch from one antenna to another if conditions on the first antenna deteriorate.

In wireless communications, multipath (also referred to as multipath propagation) is a condition in which radio signals reach an antenna by two or more paths. The causes of multipath may include atmospheric conditions, refraction or reflection (off of water bodies, buildings or mountains, for example). In digital radio communications (such as long-term evolution (LTE)), multipath may cause errors and affect the quality of communications. The effects of multipath may include constructive and destructive interference. Destructive interference may cause fading of a signal.

In LTE, RX antenna switching diversity is always on, but the TX behavior of a wireless communication device may vary depending on how it is held. For example, in an LTE frequency duplexing division (FDD) system, multipath may add up destructively for TX but may not for RX. Therefore, RX-based switching of a TX antenna alone is not sufficient. For example, the wireless communication device should switch antennas if the TX level jumps by a large amount or if the TX power level constantly touches a maximum transmit power level (MTPL).

Various configurations are now described with reference to the Figures, where like reference numbers may indicate functionally similar elements. The systems and methods as generally described and illustrated in the Figures herein could be arranged and designed in a wide variety of different configurations. Thus, the following more detailed description of several configurations, as represented in the Figures, is not intended to limit scope, as claimed, but is merely representative of the systems and methods.

Figure 1:
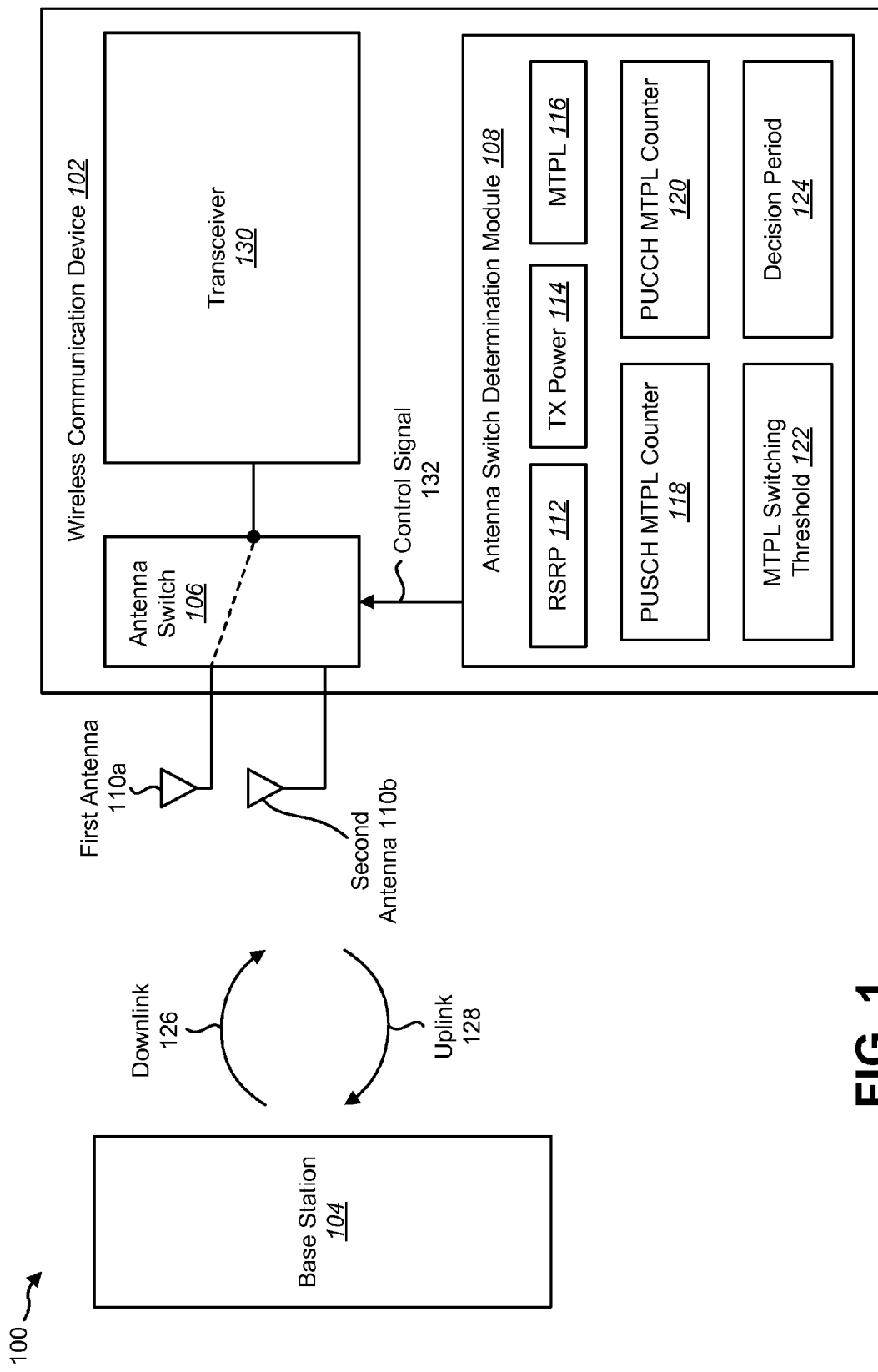
FIG. 1 shows a wireless communication system with multiple wireless devices in which systems and methods for transmit (TX) antenna switching may be performed.

FIG. 1 shows a wireless communication system 100 with multiple wireless devices in which systems and methods for transmit (TX) antenna 110 switching may be performed. Wireless communication systems 100 are widely deployed to provide various types of communication content such as voice, data, and so on. A wireless device may be a wireless communication device 102 or a base station 104.

A base station 104 is a station that communicates with one or more wireless communication devices 102. A base station 104 may also be referred to as, and may include some or all of the functionality of, an access point, a broadcast transmitter, a NodeB, an evolved NodeB, etc. The term "base station" will be used herein. Each base station 104 provides communication coverage for a particular geographic area. A base station 104 may provide communication coverage for one or more wireless communication devices 102. The term "cell" can refer to a base station 104 and/or its coverage area depending on the context in which the term is used.

A wireless communication device 102 may also be referred to as, and may include some or all of the functionality of, a terminal, an access terminal, a user equipment (UE), a subscriber unit, a station, etc. A wireless communication device 102 may be a cellular phone, a personal digital assistant (PDA), a wireless device, a wireless modem, a handheld device, a laptop computer, personal computer, music player, video player, multimedia player, television, electronic game system, digital camera, video camcorder, watch, remote control, headset, and so on.

The wireless communication system 100 may comprise a wireless local area network (WLAN) covering a physical area, such as a home, office, a group of buildings, or the like. A WLAN may use standards, such as an 802.11 standard and/or other standards, for wireless communications. In some configurations, a WLAN may use peer-to-peer communication in which the wireless communication devices 102 directly communicate with each other.

The wireless communication system 100 may also comprise a wireless personal area network (WPAN), spanning, for example, an area of a few meters. A WPAN may use standards such as infrared, Bluetooth, a WiMedia based UWB standard (e.g., ECMA-368), a ZigBee standard, and/or other standards for wireless communications. A WPAN may use peer-to-peer communication in which the wireless communication devices 102 directly communicate with each other.

The wireless communication system 100 may also comprise a wide wireless area network (WWAN). The WWAN may use standards such as WCDMA, cdma2000 1x, 1x-EV-DO, LTE, eHRPD and the like. The access terminal may connect to another network, such as a wireless communications network or the Internet, through the wireless communication system 100. The messages sent across the wireless communication system 100 may comprise information related to various types of communication (e.g., voice, data, multimedia services, and the like) and may be of varied degrees of importance to the user of the wireless communication device 102, as described in greater detail below.

Communications in a wireless system (e.g., a multiple-access system) may be achieved through transmissions over a wireless link. Such a communication link may be established via a single-input and single-output (SISO), multiple-input and single-output (MISO), multiple-input and multiple-output (MIMO), or a coordinated multipoint (CoMP) system. A MIMO system includes transmitter(s) and receiver(s) equipped, respectively, with multiple (NT) transmit antennas and multiple (NR) receive antennas for data transmission. SISO and MISO systems are particular instances of a MIMO system. The MIMO system can provide improved performance (e.g., higher throughput, greater capacity or improved reliability) if the additional dimensionalities created by the multiple transmit and receive antennas are utilized.

The wireless communication system 100 may utilize MIMO. A MIMO system may support both time division duplex (TDD) and frequency division duplex (FDD) systems. In a TDD system, uplink 128 and downlink 126 transmissions are on the same frequency region so that the reciprocity principle allows the estimation of the downlink 126 channel from the uplink 128 channel. This enables a transmitting wireless device to extract transmit beamforming gain from communications received by the transmitting wireless device.

The wireless communication system 100 may be a multiple-access system capable of supporting communication with multiple wireless communication devices 102 by sharing the available system resources (e.g., bandwidth and transmit power). Examples of such multiple-access systems include code division multiple access (CDMA) systems, wideband code division multiple access (W-CDMA) systems, time division multiple access (TDMA) systems, frequency division multiple access (FDMA) systems, orthogonal frequency division multiple access (OFDMA) systems, single-carrier frequency division multiple access (SC-FDMA) systems, $3^{rd}$ Generation Partnership Project (3GPP) Long Term Evolution (LTE) systems and spatial division multiple access (SDMA) systems.

The terms "networks" and "systems" are often used interchangeably. A CDMA network may implement a radio technology such as Universal Terrestrial Radio Access (UTRA), cdma2000, etc. UTRA includes W-CDMA and Low Chip Rate (LCR) while cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDMA, etc. UTRA, E-UTRA, and GSM are part of Universal Mobile Telecommunication System (UMTS). Long Term Evolution (LTE) is a release of UMTS that uses E-UTRA. UTRA, E-UTRA, GSM, UMTS and LTE are described in documents from an organization named "3rd Generation Partnership Project" (3GPP). cdma2000 is described in documents from an organization named "3rd Generation Partnership Project 2" (3GPP2). For clarity, certain aspects of the techniques are described below for LTE, and LTE terminology is used in much of the description below.

A wireless communication device 102 may communicate with zero, one, or multiple base stations 104 on the downlink 126 and/or uplink 128 at any given moment. Multiple channels may be used between a base station 104 and a wireless communication device 102 on both the downlink 126 and the uplink 128. A physical uplink shared channel (PUSCH) may be used to transmit user data from a wireless communication device 102 to a base station 104. A physical uplink control channel (PUCCH) may be used to transport user signaling data from a wireless communication device 102 to a base station 104. A physical downlink shared channel (PDSCH) may be used to transmit common user data and control information from a base station 104 to a wireless communication device 102. A physical downlink control channel (PDCCH) may be used to transmit control information from a base station 104 to a wireless communication device 102.

The wireless communication device 102 may include a first antenna 110a and a second antenna 110b. The first antenna 110a may also be referred to as a primary antenna. The second antenna 110b may also be referred to as a secondary antenna or a diversity antenna. In some configurations, antenna switching diversity may be used to improve receive (RX) and transmit (TX) performance. For example, a wireless communication device may switch from one antenna 110 to another if conditions on the original antenna 110 deteriorate.

The wireless communication device 102 may include an antenna switch 106. The antenna switch 106 may be coupled to the first antenna 110a and the second antenna 110b. The antenna switch 106 may couple the antennas 110a-b to a transceiver 130. The transceiver 130 may include a transmitter and a receiver. The antenna switch 106 may enable one of the antennas 110 (e.g., either the first antenna 110a or the second antenna 110b) to transmit signals. Therefore, the transceiver 130 may transmit signals on the uplink 128 via the selected antenna 110. It should be noted that while a single antenna switch 106 is described in FIG. 1 for TX operation, the wireless communication device 102 may include multiple antenna switches 106 to select an antenna 110 for RX and an antenna 110 TX operation. The RX antenna 110 may or may not be the same as the TX antenna 110.

In one approach, the TX antenna 110 switching is based on RX performance. For example, the wireless communication device 102 may determine the reference signal received power (RSRP) 112 of the first antenna 110a and the second antenna 110b. If the RSRP 112 of one antenna 110 is worse than another antenna 110, then the wireless communication device 102 may switch to the better antenna 110. However, in an FDD system, multipath can add up destructively for TX while RX performance may not be affected. For example, in a situation where multipath adds up destructively on the UL 128 at the base station 104, the DL 126 may be fine. In this example, an RX-based switching decision may not detect the need for switching. Hence RX-based switching of the TX antenna 110 alone is not sufficient.

With antenna switching diversity, the antenna 110 that is used to transmit a signal on the UL 128 may switch based on TX conditions. The reason behind having antenna switching diversity is the RX and TX isolation may be different. One condition that may motivate an antenna 110 switch is multipath. As described above, multipath is a condition in which radio signals reach an antenna by two or more paths. The effects of multipath may include constructive and destructive interference. The way the wireless communication device 102 is held may impact the TX performance of the first antenna 110a and the second antenna 110b differently.

In a frequency duplexing division (FDD) system, multipath may add up destructively for TX but may not for RX. Furthermore, multipath interference may impact one antenna 110 differently than another antenna 110. For instance, the first antenna 110a may experience TX interference, while the second antenna 110b may experience no TX interference or less TX interference than the first antenna 110a. Therefore, RX-based switching of the TX antenna may not adequately account for TX performance. Therefore, in addition to RX-based switching, the wireless communication device 102 may trigger an antenna 110 switch based on TX performance.

In one approach, the wireless communication device 102 may determine whether to switch antennas 110 based only on a PUSCH. For example, if the TX power 114 for PUSCH transmissions is at a maximum transmit power level (MTPL) 116 for a certain number of subframes during a decision period 124, an antenna 110 switch may be triggered. However, a PUSCH-only approach may miss several opportunities to evaluate TX performance and may delay antenna 110 switching. For example, a PUSCH transmission may occur when the base station schedules an UL grant for the wireless communication device 102. In some cases, UL grants for a PUSCH transmission may be infrequently scheduled. Therefore, antenna 110 switching based on the PUSCH may occur slowly or may not occur at all.

However, there may be transmissions from the wireless communication device 102 without an UL grant. The wireless communication device 102 may send PUCCH transmissions that include channel state feedback information without an UL grant. This channel state feedback information may include channel quality indicator (CQI) reports, rank indicator (RI) reports and acknowledgment/negative-acknowledgment (ACK/NACK) or HARQ-ACK messages. Because this channel state feedback information is important for UL 128 performance, it is beneficial that the base station 104 receive this information using the best antenna 110 available. In some cases, there may be more PUCCH transmissions than PUSCH transmissions. Therefore, in addition to evaluating the PUSCH, the wireless communication device 102 may also consider the PUCCH when determining whether to switch antennas 110.

The wireless communication device 102 may include an antenna switch determination module 108 that determines whether to transmit using the first antenna 110a or the second antenna 110b. The antenna switch determination module 108 may be coupled to the antenna switch 106. The antenna switch determination module 108 may provide a control signal 132 to the antenna switch 106 that indicates which antenna 110 is selected for TX operation. It should be noted that while the antenna switch 106 and the antenna switch determination module 108 are shown as separate components in FIG. 1, in another configuration, the antenna switch determination module 108 may be included in the antenna switch 106.

In one configuration, the wireless communication device 102 may transmit using the first antenna 110a. The transmit antenna 110a may be a primary antenna 110 for TX operation. The second antenna 110b may be a secondary or diversity antenna 110.

The antenna switch determination module 108 may determine whether a trigger occurs to switch to transmitting using the second antenna 110b. The antenna switch determination module 108 may determine whether to switch to transmitting using the second antenna 110b based on the MTPL 116.

In one configuration, the trigger is based on the amount of power used for physical uplink shared channel (PUSCH) transmissions and physical uplink control channel (PUCCH) transmissions. The antenna switch determination module 108 may monitor the first antenna 110a. The TX power 114 is the amount of power used to transmit a subframe. The wireless communication device 102 may be configured with an MTPL 116, which is the maximum amount of power that the wireless communication device 102 should use for transmissions. In one configuration, the MTPL 116 may be 23 dBm, but this value may vary depending on the network. If the TX power 114 is greater than or equal to MTPL 116, then the wireless communication device 102 is transmitting at the peak transmit power. This typically occurs when channel conditions are bad or the wireless communication device 102 is held in such a way that it must transmit at that peak power.

The antenna switch determination module 108 may evaluate the TX power 114 for the PUSCH and the PUCCH over a decision period 124. In one configuration, the decision period 124 is 640 ms, which may correspond to 640 subframes. The antenna switch determination module 108 may increment the PUSCH MTPL counter 118 if the TX power 114 for a PUSCH subframe is greater than or equal to the MTPL 116. The antenna switch determination module 108 may increment the PUCCH MTPL counter 120 if the TX power 114 for a PUSCH subframe is greater than or equal to the MTPL 116.

The PUSCH MTPL counter 118 may reflect the amount of time in the decision period 124 that PUSCH transmissions were at the MTPL 116. Likewise, the PUCCH MTPL counter 120 may reflect the amount of time in the decision period 124 that PUCCH transmissions were at the MTPL 116.

At the end of the decision period 124, the antenna switch determination module 108 may determine whether to switch to transmitting using the second antenna 110b. The trigger to switch antennas 110 may be based on a combination of the PUSCH MTPL counter 118 and the PUCCH MTPL counter 120. The antenna switch determination module 108 may combine the PUSCH MTPL counter 118 and the PUCCH MTPL counter 120 to determine whether an antenna 110 switch trigger occurs.

The antenna switch determination module 108 may trigger an antenna 110 switch if the combined MTPL counters exceed an MTPL switching threshold 122. In one configuration, the trigger occurs when the when the ratio of the combined MTPL counters over the total number of uplink subframes within the decision period 124 is greater than an MTPL switching threshold 122 of 50%. In this case, the MTPL switching threshold 122 is a percentage of PUSCH or PUCCH subframes within the decision period 124 in which the TX power 114 is greater than or equal to the MTPL 116.

In one example, wireless communication device 102 is transmitting on the first antenna 110a, the decision period 124 is 640 ms and the MTPL switching threshold 122 is 50%. As described above, this corresponds to 640 subframes. The antenna switch determination module 108 may add the PUSCH MTPL counter 118 and the PUCCH MTPL counter 120 and divide the sum by 640 to get the ratio of the combined MTPL counters over the total number of uplink subframes within the decision period 124. Because the MTPL switching threshold 122 is 50%, then for this example, if the sum of the PUSCH MTPL counter 118 and the PUCCH MTPL counter 120 is greater than 320, then the antenna switch determination module 108 may trigger the antenna switch 106 to switch to the second antenna 110b.

It should be noted that while the decision period 124 has been described in terms of time (e.g., 640 ms), the decision period 124 may be defined in other units. For example, the decision period 124 may be defined in terms of subframes. Similarly, while the MTPL switching threshold 122 has been described in terms of a percentage (e.g., 50%), the switching threshold 122 may also be defined in other units. For example, the switching threshold may be a number of subframes, or simply a configurable integer value.

Upon determining that a trigger occurs to switch antennas 110, the antenna switch determination module 108 may send a command signal 132 to the antenna switch 106 to switch from the first antenna 110a to the second antenna 110b.

Some benefits of using a TX antenna switch 106 as described herein include improved network capacity, reduced current consumption, lower TX power 114, fewer dropped calls and less power allocation to a channel under power control. By including both the PUSCH and the PUCCH in the antenna 110 switch determination, the TX antenna 110 switch time can be reduced (when there is not continuous uplink allocation, for instance). This can also help in the effective transmission of channel state feedback (e.g., CQIs, RI) along with HARQ-ACK feedback on the new TX antenna 110 (i.e., the switched-to antenna 110).

Figure 2:
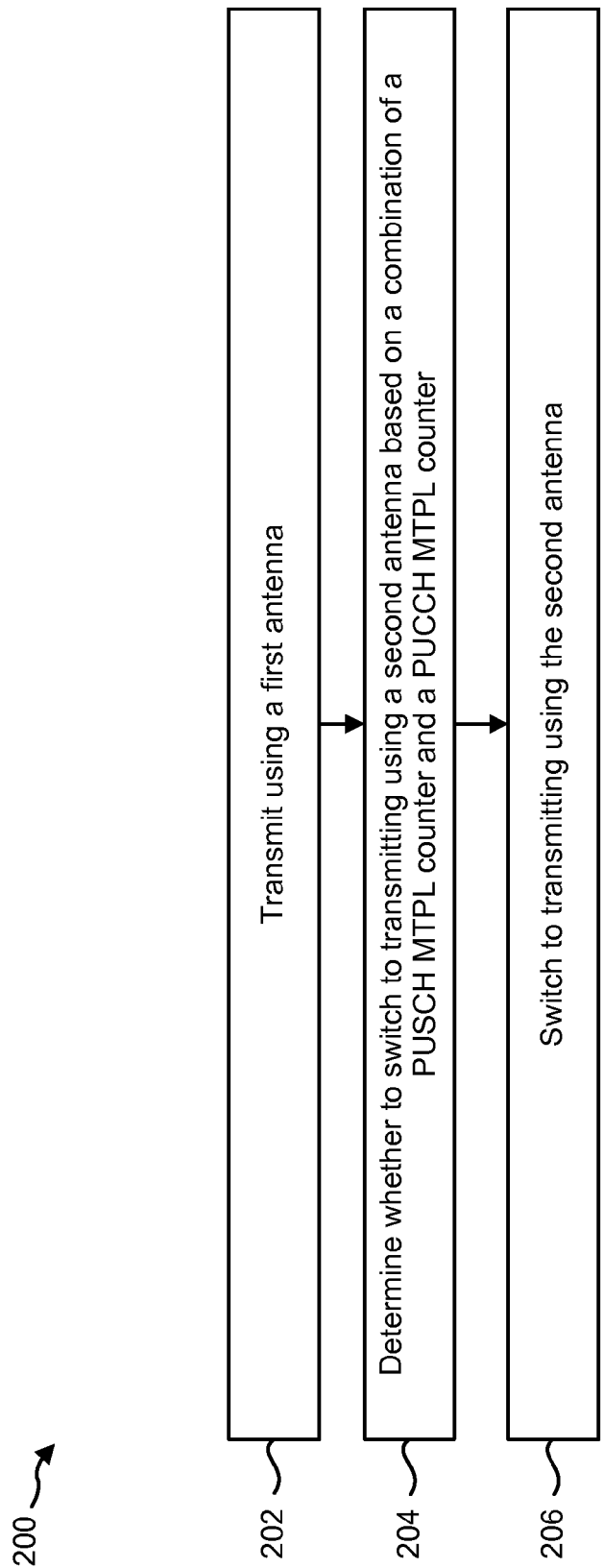
FIG. 2 is a flow diagram illustrating a method for TX antenna switching.

FIG. 2 is a flow diagram illustrating a method 200 for transmit (TX) antenna 110 switching. The method 200 may be implemented by a wireless communication device 102 that includes at least two transmit antennas 110.

The wireless communication device 102 may transmit 202 using a first antenna 110a. For example, the wireless communication device 102 may transmit on one or more UL 128 channels. These UL 128 channels may include a PUSCH and a PUCCH.

The wireless communication device 102 may determine 204 whether a trigger occurs to switch to transmitting using a second antenna 110b. In one configuration, the trigger is based on the amount of power used for physical uplink shared channel (PUSCH) transmissions and a physical uplink control channel (PUCCH) transmissions. The wireless communication device 102 may maintain a PUSCH MTPL counter 118 and a PUCCH MTPL counter 120.

The wireless communication device 102 may monitor the first antenna 110a. The wireless communication device 102 may evaluate the TX power 114 for the PUSCH and the PUCCH over a decision period 124. The wireless communication device 102 may increment the PUSCH MTPL counter 118 if the TX power 114 for a PUSCH subframe is greater than or equal to the MTPL 116. The wireless communication device 102 may increment the PUCCH MTPL counter 120 if the TX power 114 for a PUSCH subframe is greater than or equal to the MTPL 116.

At the end of the decision period 124, the wireless communication device 102 may determine whether to switch to transmitting using the second antenna 110b. The trigger to switch antennas 110 may be based on a combination of the PUSCH MTPL counter 118 and the PUCCH MTPL counter 120. The wireless communication device 102 may combine the PUSCH MTPL counter 118 and the PUCCH MTPL counter 120 to determine whether an antenna 110 switch trigger occurs.

The antenna switch determination module 108 may trigger an antenna 110 switch if the combined MTPL counters exceed an MTPL switching threshold 122. In one configuration, the trigger occurs when the when the ratio of the combined MTPL counters over the total number of uplink subframes within the decision period 124 is greater than an MTPL switching threshold 122 of 50%.

Upon determining that a trigger occurs to switch antennas 110, the wireless communication device 102 may switch 206 to transmitting using the second antenna 110b. After switching from the first antenna 110a to the second antenna 110b, it may be beneficial to detect that the second antenna 110b is not worse than the first antenna 110a. Thus, the wireless communication device 102 may perform a switch-back search to determine whether the second antenna 110b is better or worse. This is described in more detail in connection with FIG. 5.

Figure 3:
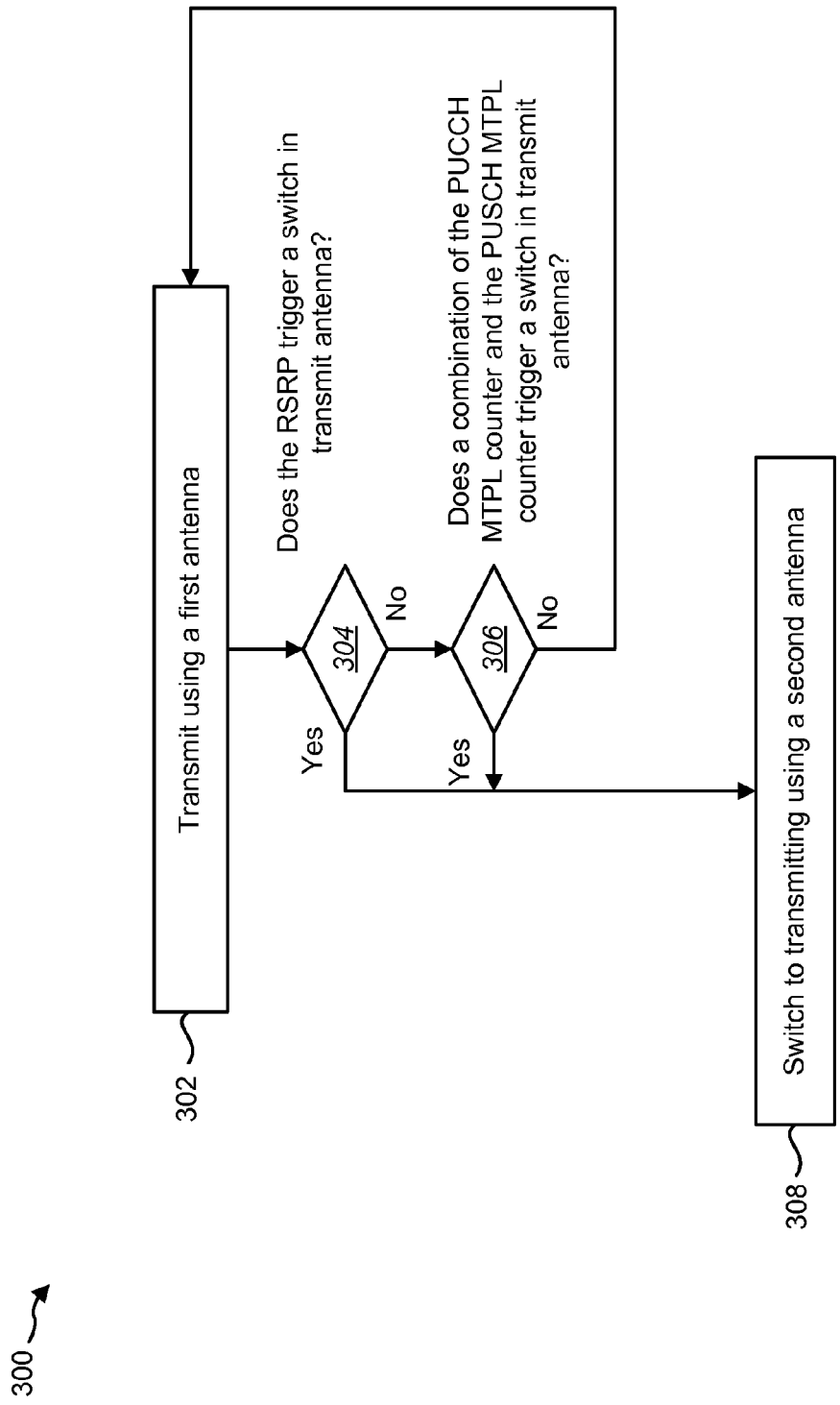
FIG. 3 is a flow diagram illustrating a detailed configuration of a method for TX antenna switching.

FIG. 3 is a flow diagram illustrating a detailed configuration of a method 300 for transmit (TX) antenna 110 switching. The method 300 may be performed by a wireless communication device 102 that includes at least two transmit antennas 110. The wireless communication device 102 may transmit 302 using the first antenna 110a. For example, the wireless communication device 102 may transmit on one or more UL 128 channels. These UL 128 channels may include a PUSCH and a PUCCH.

The wireless communication device 102 may determine 304 whether a reference signal received power (RSRP) 112 triggers a switch in transmit antennas 110. For example, the wireless communication device 102 may determine if an RSRP delta is greater than an RSRP high threshold or whether an RSRP delta average greater than an RSRP low threshold. This may be accomplished as described in connection with FIG. 5. If the RSRP 112 triggers a switch in transmit antennas 110, the wireless communication device 102 may switch 308 to transmitting using the second antenna 110b.

If the wireless communication device 102 determines 304 that the RSRP 112 does not trigger a switch in transmit antenna 110, the wireless communication device 102 may determine 306 whether a combination of the PUSCH MTPL counter 118 and the PUCCH MTPL counter 120 triggers a switch in transmit antenna 110. For example, the wireless communication device 102 may determine whether the combination of the PUSCH MTPL counter 118 and the PUCCH MTPL counter 120 is greater than an MTPL switching threshold 122. This may be accomplished as described above in connection with FIG. 2.

If the combination of the PUSCH MTPL counter 118 and the PUCCH MTPL counter 120 triggers a switch in transmit antennas 110, the wireless communication device 102 may switch 308 to transmitting using the second antenna 110b. If the combination of the PUSCH MTPL counter 118 and the PUCCH MTPL counter 120 does not trigger a switch in transmit antennas, the wireless communication device 102 may continue transmitting 302 using the first antenna 110a.

Figure 4:
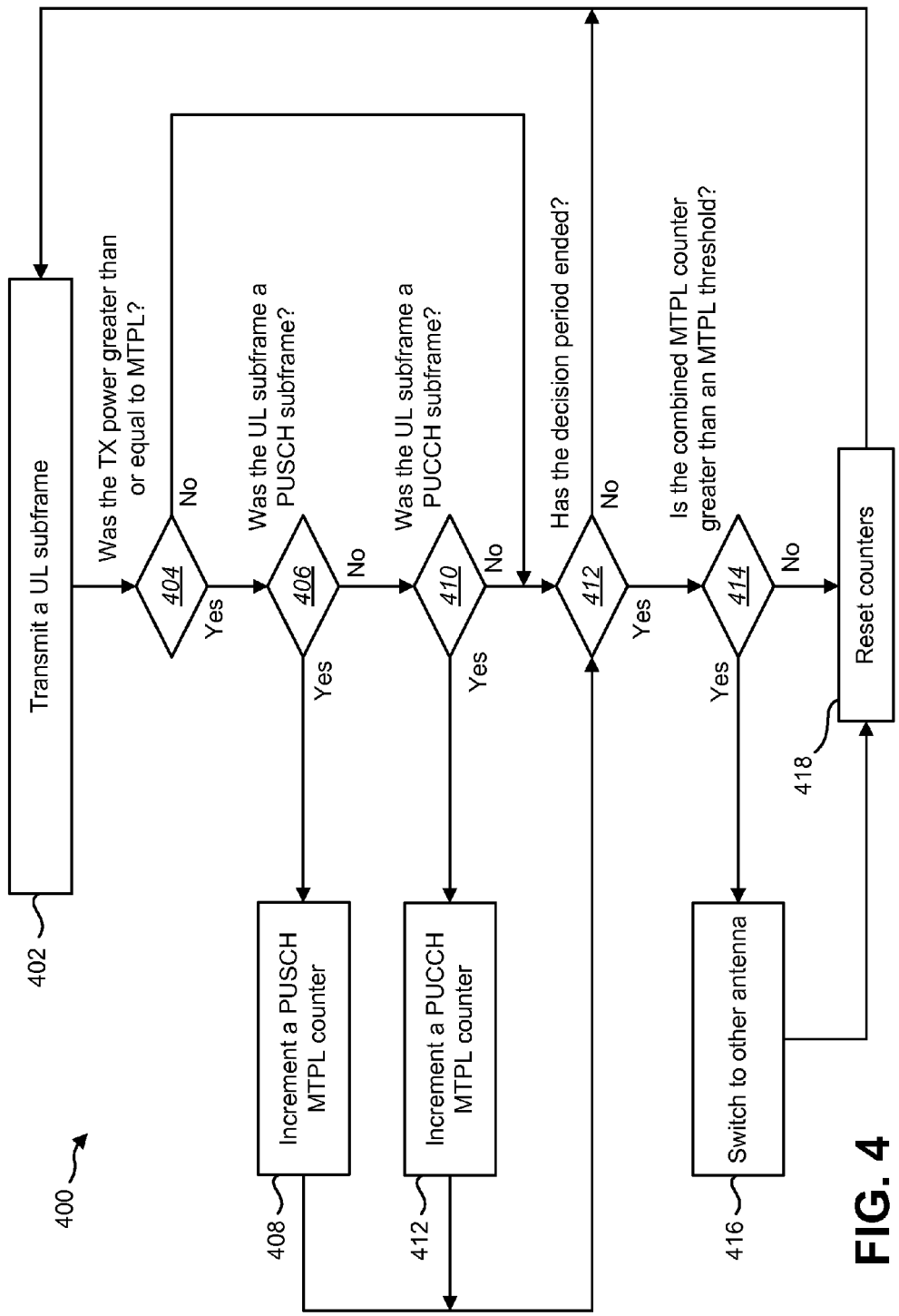
FIG. 4 is a flow diagram illustrating another detailed configuration of a method for TX antenna switching.

FIG. 4 is a flow diagram illustrating another detailed configuration of a method 400 for transmit (TX) antenna 110 switching. The method 400 may be performed by a wireless communication device 102 that includes at least two transmit antennas 110. The wireless communication device 102 may transmit 402 an UL subframe. For example, the wireless communication device 102 may transmit using a first antenna 110a or a second antenna 110b. The wireless communication device 102 may transmit on one or more UL 128 channels.

The method 400 may be performed during a decision period 124 to determine whether to switch to another antenna 110 for the next decision period 124. In one configuration, the decision period 124 may be 640 ms, which may encompass 640 subframes.

The wireless communication device 102 may determine 404 whether the TX power 114 of the UL subframe is greater than or equal to the MTPL 116. The TX power 114 is the amount of power used to transmit a subframe. The MTPL 116 is the maximum amount of power that the wireless communication device 102 should use for transmissions.

If the TX power 114 of the UL subframe is less than the MTPL 116, then the wireless communication device 102 may determine 412 whether the decision period 124 has ended. If the decision period 124 has not ended, then the wireless communication device 102 may continue to transmit 402 another UL subframe.

If the wireless communication device 102 determines 404 that the TX power 114 of the UL subframe is greater than or equal to the MTPL 116, then the wireless communication device 102 may determine 406 whether the UL subframe was a PUSCH subframe. If the UL subframe was a PUSCH subframe, then the wireless communication device 102 may increment 408 a PUSCH MTPL counter 118. For example, the wireless communication device 102 may add one to the value of the PUSCH MTPL counter 118. The wireless communication device 102 may then determine 412 whether the decision period 124 has ended. If the decision period 124 has not ended, then the wireless communication device 102 may continue to transmit 402 another UL subframe.

If the wireless communication device 102 determines 406 that the UL subframe was not a PUSCH subframe, then the wireless communication device 102 may determine 410 whether the UL subframe was a PUCCH subframe. If the UL subframe was a PUCCH subframe, then the wireless communication device 102 may increment 412 a PUCCH MTPL counter 120. For example, the wireless communication device 102 may add one to the value of the PUCCH MTPL counter 120. The wireless communication device 102 may then determine 412 whether the decision period 124 has ended. If the decision period 124 has not ended, then the wireless communication device 102 may continue to transmit 402 another UL subframe.

If the wireless communication device 102 determines 412 that the decision period 124 has ended, then the wireless communication device 102 may determine 414 whether the combined MTPL counter (e.g., the combination of the PUSCH MTPL counter 118 and the PUCCH MTPL counter 120) is greater than an MTPL threshold 122. In one configuration, the trigger occurs when the when the ratio of the combined MTPL counters over the total number of uplink subframes within the decision period 124 is greater than an MTPL switching threshold 122 of 50%.

If the combined MTPL counter is greater than the MTPL threshold 122, then the wireless communication device 102 may switch 416 to the other antenna 110 and reset 418 the PUSCH MTPL counter 118 and the PUCCH MTPL counter 120. If the combined MTPL counter is not greater than the MTPL threshold 122, then the wireless communication device 102 may continue transmitting using the current antenna 110 and reset 418 the PUSCH MTPL counter 118 and the PUCCH MTPL counter 120. Upon resetting 418 the counters 118, 120, the wireless communication device 102 may transmit 402 a UL subframe.

Figure 5:
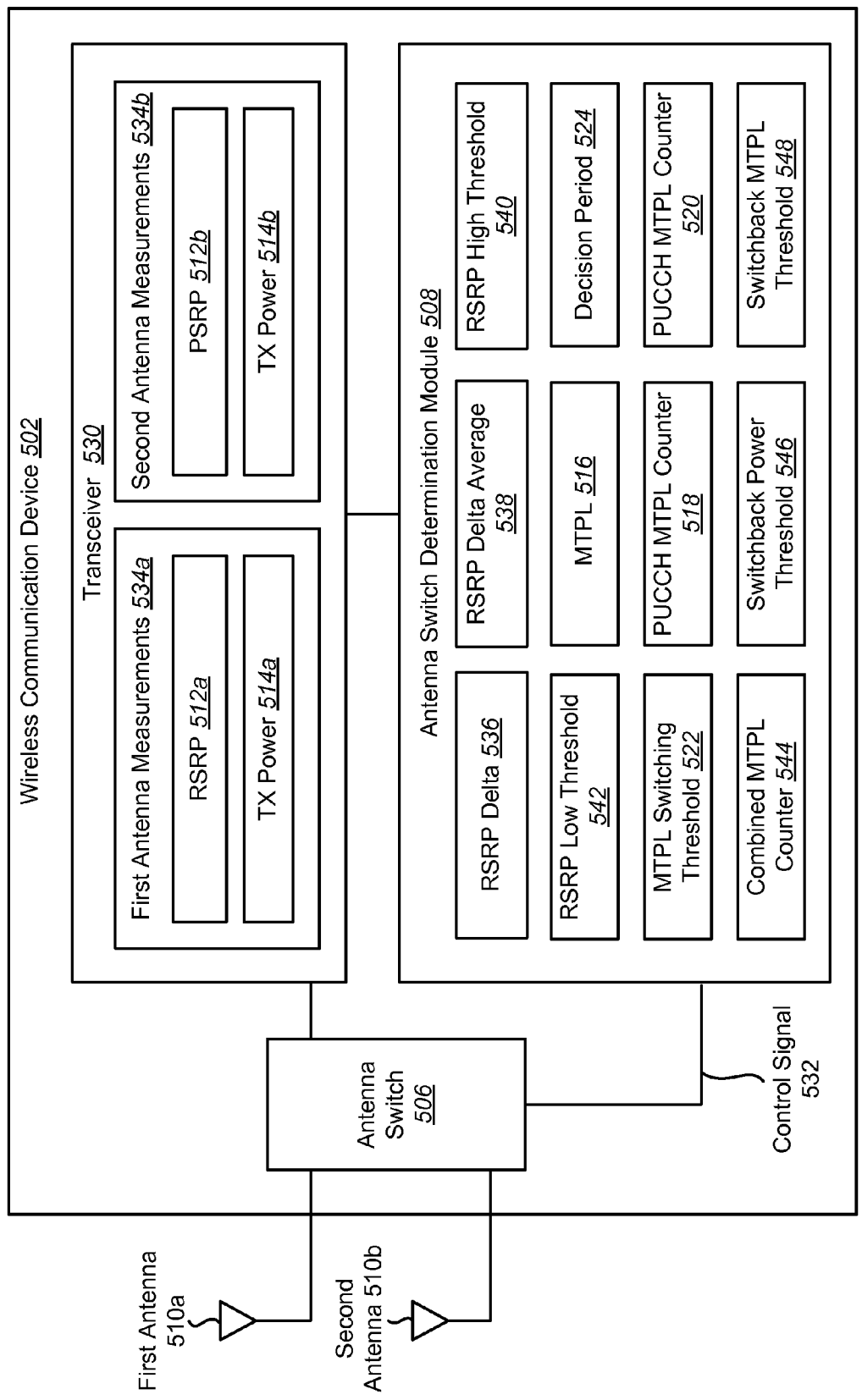
FIG. 5 is a block diagram illustrating one configuration of a wireless communication device in which systems and methods for TX antenna switching may be performed.

FIG. 5 is a block diagram illustrating one configuration of a wireless communication device 502 in which systems and methods for transmit (TX) antenna 510 switching may be performed. The wireless communication device 502 may be implemented in accordance with the wireless communication device 102 described in connection with FIG. 1. The wireless communication device 502 may communicate with one or more base stations 104 on a DL 126 and an UL 128.

The wireless communication device 502 may include a first antenna 510a and a second antenna 510b. The first antenna 510a may also be referred to as a primary antenna. The second antenna 510b may also be referred to as a secondary antenna or a diversity antenna.

The wireless communication device 502 may also include an antenna switch 506. The antenna switch 506 may be coupled to the first antenna 510a and the second antenna 510b. The antenna switch 506 may couple the antennas 510a-b to a transceiver 530. The transceiver 530 may include a transmitter and a receiver. The antenna switch 506 may connect one of the antennas 510 (e.g., either the first antenna 510a or the second antenna 510b) to the transceiver 530 to transmit signals. Therefore, the transceiver 530 may transmit signals on the uplink 128 via the selected antenna 510.

The transceiver 530 may obtain first antenna measurements 534a and second antenna measurements 534b. The first antenna measurements 534a may include the RSRP 512a and the TX power 514a of the first antenna 510a. The second antenna measurements 534b may include the RSRP 512b and the TX power 514b of the second antenna 510b.

The wireless communication device 502 may include an antenna switch determination module 508 that determines whether to transmit using the first antenna 510a or the second antenna 510b. The antenna switch determination module 508 may be coupled to the antenna switch 506. The antenna switch determination module 508 may provide a control signal 532 to the antenna switch 506 that indicates which antenna 510 is selected for TX operation.

The trigger for TX antenna 510 switching may be based, in part, on RX performance. For example, the wireless communication device 502 may determine the RSRP 512 of the first antenna 510a and the second antenna 510b. The antenna switch determination module 508 may include the RSRP delta 536, which describes the change in RSRP 512 over a short period of time of the selected antenna 510. The antenna switch determination module 508 may also include an RSRP delta average 538, which describes the average change of RSRP 512 of the selected antenna 510.

The antenna switch determination module 508 may include an RSRP high threshold 540. When the RSRP delta 536 is greater than the RSRP high threshold 540, the antenna switch determination module 508 may switch antennas 510. The antenna switch determination module 508 may also include an RSRP low threshold 542. When the RSRP delta average 538 is greater than the RSRP low threshold 542, the antenna switch determination module 508 may switch antennas 510.

In some cases, RX-based switching decisions may not detect the need for switching. For example, in situations where multipath adds up destructively at the base station 104 while the downlink 126 remains unchanged. Therefore, the wireless communication device 502 may also base antenna 510 switching on TX performance.

The antenna switch determination module 508 may trigger an antenna 510 switch if the MTPL 516 is reached for a high percentage of time during the decision period 524. In one configuration, the antenna switch determination module 508 may base antenna 510 switching on PUSCH configurations and PUCCH configurations. For example, the antenna 510 switch trigger may be based on the amount of power used for physical uplink shared channel (PUSCH) transmissions and a physical uplink control channel (PUCCH) transmissions.

The antenna switch determination module 508 may evaluate the TX power 514 for the PUSCH and the PUCCH over a decision period 524. When the first antenna 510a is selected as the TX antenna 510, the antenna switch determination module 508 may monitor the TX power 514a of the first antenna 510a. Similarly, when the second antenna 510b is selected as the TX antenna 510, the antenna switch determination module 508 may monitor the TX power 514b of the second antenna 510b. In one configuration, the decision period 524 is 640 ms, which may correspond to 640 subframes.

The antenna switch determination module 508 may increment the PUSCH MTPL counter 518 if the TX power 514 for a PUSCH subframe is greater than or equal to the MTPL 516. The antenna switch determination module 508 may increment the PUCCH MTPL counter 520 if the TX power 514 for a PUSCH subframe is greater than or equal to the MTPL 516.

At the end of the decision period 524, the antenna switch determination module 508 may determine whether to switch to transmitting using the second antenna 510b. The trigger to switch antennas 510 may be based on a combination of the PUSCH MTPL counter 518 and the PUCCH MTPL counter 520. In one configuration, the antenna switch determination module 508 may combine the PUSCH MTPL counter 518 and the PUCCH MTPL counter 520 in a combined MTPL counter 544 to determine whether an antenna 510 switch trigger occurs.

The antenna switch determination module 508 may trigger an antenna 510 switch if the combined MTPL counter 544 exceeds an MTPL switching threshold 522. This may be accomplished as described above in connection with FIG. 4.

Upon determining that a trigger occurs to switch antennas 510, the antenna switch determination module 508 may send a command signal 532 to the antenna switch 506 to switch antennas 510. For example, if the first antenna 510a is the current TX antenna 510, the control signal 532 may instruct the antenna switch 506 to switch to the second antenna 510b. The antenna switch determination module 508 may then reset the PUSCH MTPL counter 518 and the PUCCH MTPL counter 520.

After switching antennas 510, it may be beneficial to detect that the switched-to antenna 510 is not worse than the original antenna 510. Thus, the antenna switch determination module 508 may perform a switchback analysis to determine whether the switched-to antenna 510 is better or worse.

The antenna switch determination module 508 may determine whether the RSRP 512 of the switched-to antenna 510 is worse than the RSRP 512 of the original antenna 510. For example, upon switching from the first antenna 510a to the second antenna 510b, the antenna switch determination module 508 may determine whether the RSRP 512b of the second antenna 510b is worse than the RSRP 512a of the first antenna 510a. If the RSRP 512b of the second antenna 510b is worse than the RSRP 512a of the first antenna 510a, the antenna switch determination module 508 may trigger a switch back to transmitting using the first antenna 510a.

The antenna switch determination module 508 may determine whether the TX power 514 of the switched-to antenna 510 is greater than a switchback power threshold 546. For example, the antenna switch determination module 508 may determine whether the TX power 514b of the second antenna 510b is greater than a switchback power threshold 546. In one configuration, the switchback power threshold 546 may be 10 decibels (dB). If the TX power 514 of the switched-to antenna 510 goes above the switchback power threshold 546, then the antenna switch determination module 508 may switch back to the original antenna 510.

The antenna switch determination module 508 may also determine whether an MTPL count on the switched-to antenna 510 exceeds the combined MTPL count (e.g., the combined MTPL counter 544) on the original antenna 510 plus a switchback MTPL threshold 548. In one configuration, the switchback MTPL threshold 548 may be 30%.

The antenna switch determination module 508 may evaluate the TX power 514 of the switched-to antenna 510 during a new decision period 524. The antenna switch determination module 508 may increment the PUSCH MTPL counter 518 when the TX power 514 of a PUSCH subframe is greater than or equal to the MTPL 516. The antenna switch determination module 508 may increment the PUCCH MTPL counter 520 when the TX power 514 of a PUCCH subframe is greater than or equal to the MTPL 516. If the combined MTPL count (e.g., the PUSCH MTPL counter 518 and the PUCCH MTPL counter 520) on the switched-to antenna 510 is greater than the combined MTPL count on the original antenna 510 plus the switchback MTPL threshold 548, then the antenna switch determination module 508 may switch back to the original antenna 510.

Figure 6:
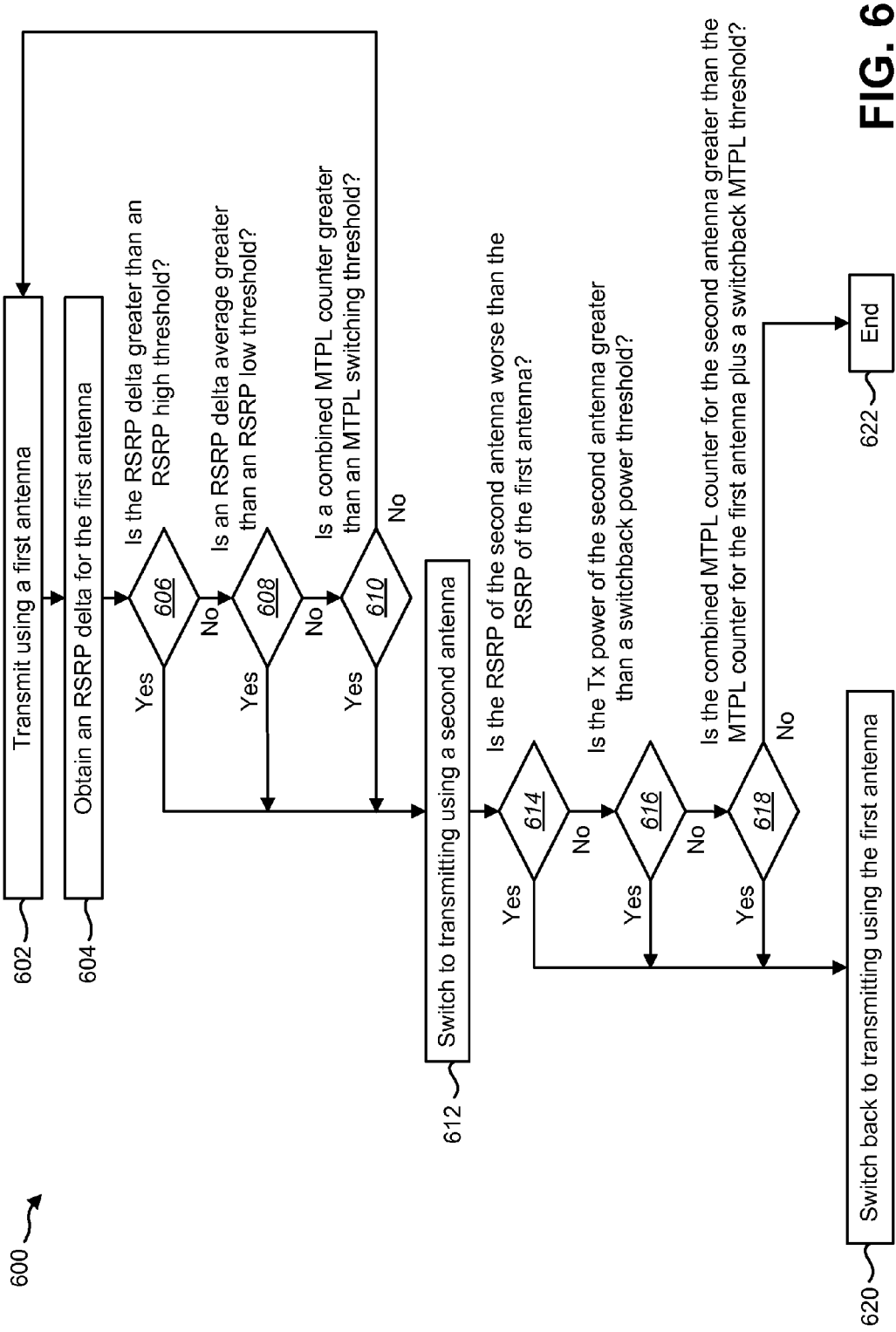
FIG. 6 is a flow diagram illustrating yet another detailed configuration of a method for TX antenna switching.

FIG. 6 is a flow diagram illustrating yet another detailed configuration of a method 600 for transmit (TX) antenna 110 switching. The method 600 may be performed by a wireless communication device 502 that includes at least two transmit antennas 510. The wireless communication device 502 may transmit 602 using a first antenna 510a. The wireless communication device 102 may transmit on one or more UL 128 channels.

The wireless communication device 502 may obtain 604 an RSRP delta 536 for the first antenna 510a. The wireless communication device 502 may determine 606 whether the RSRP delta 536 is greater than an RSRP high threshold 540. If the RSRP delta 536 is greater than an RSRP high threshold 540, then the wireless communication device 502 may switch 612 to transmitting using a second antenna 510b.

If the RSRP delta 536 is not greater than the RSRP high threshold 540, the wireless communication device 502 may determine 608 whether an RSRP delta average 538 is greater than an RSRP low threshold 542. If the RSRP delta average 538 is greater than the RSRP low threshold 542, the wireless communication device 502 may switch 612 to transmitting using the second antenna 510b.

If the RSRP delta average 538 is not greater than the RSRP low threshold 542, the wireless communication device 502 may determine 610 whether a combined MTPL counter 544 is greater than an MTPL switching threshold 522. If either the PUSCH MTPL counter 518 or the PUCCH MTPL counter 520 or the combination of both is greater than an MTPL switching threshold 522, the wireless communication device 502 may switch 612 to transmitting using the second antenna 510b. If the combined MTPL counter 544 is not greater than the MTPL switching threshold 522, the wireless communication device 502 may continue transmitting using the first antenna 510a.

After switching to the second antenna 510b, the wireless communication device 502 may determine 614 whether the RSRP 512 of the second antenna 510b is worse than the RSRP 512 of the first antenna 510a. If the RSRP 512 of the second antenna 510b is worse than the RSRP 512 of the first antenna 510a, the wireless communication device 502 may switch 620 back to transmitting using the first antenna 510a.

If the RSRP 512 of the second antenna 510b is not worse than the RSRP 512 of the first antenna 510a, the wireless communication device 502 may determine 616 whether the TX power 514b of the second antenna 510b is greater than a switchback power threshold 546. If the TX power 514b of the second antenna 510b is greater than the switchback power threshold 546, the wireless communication device 502 may switch 620 back to transmitting using the first antenna 510a.

If the TX power 514b of the second antenna 510b is not greater than the switchback power threshold 546, the wireless communication device 502 may determine 618 whether the MTPL count on the second antenna 510b is greater than the MTPL count of the first antenna 510a plus a switchback MTPL threshold 548. In one configuration, the MTPL count of an antenna 510 may be a combination of the PUSCH MTPL counter 518 count and the PUCCH MTPL counter 520 count. If the MTPL count of the second antenna 510b is greater than the MTPL count of the first antenna 510a plus the switchback MTPL threshold 548, the wireless communication device 502 may switch 620 back to transmitting using the first antenna 510a. If the MTPL count of the second antenna 510b is not greater than the MTPL count of the first antenna 510a plus the switchback MTPL threshold 548, the wireless communication device 502 may continue transmitting using the second antenna 510b and the method 600 may end 622.

Figure 7:
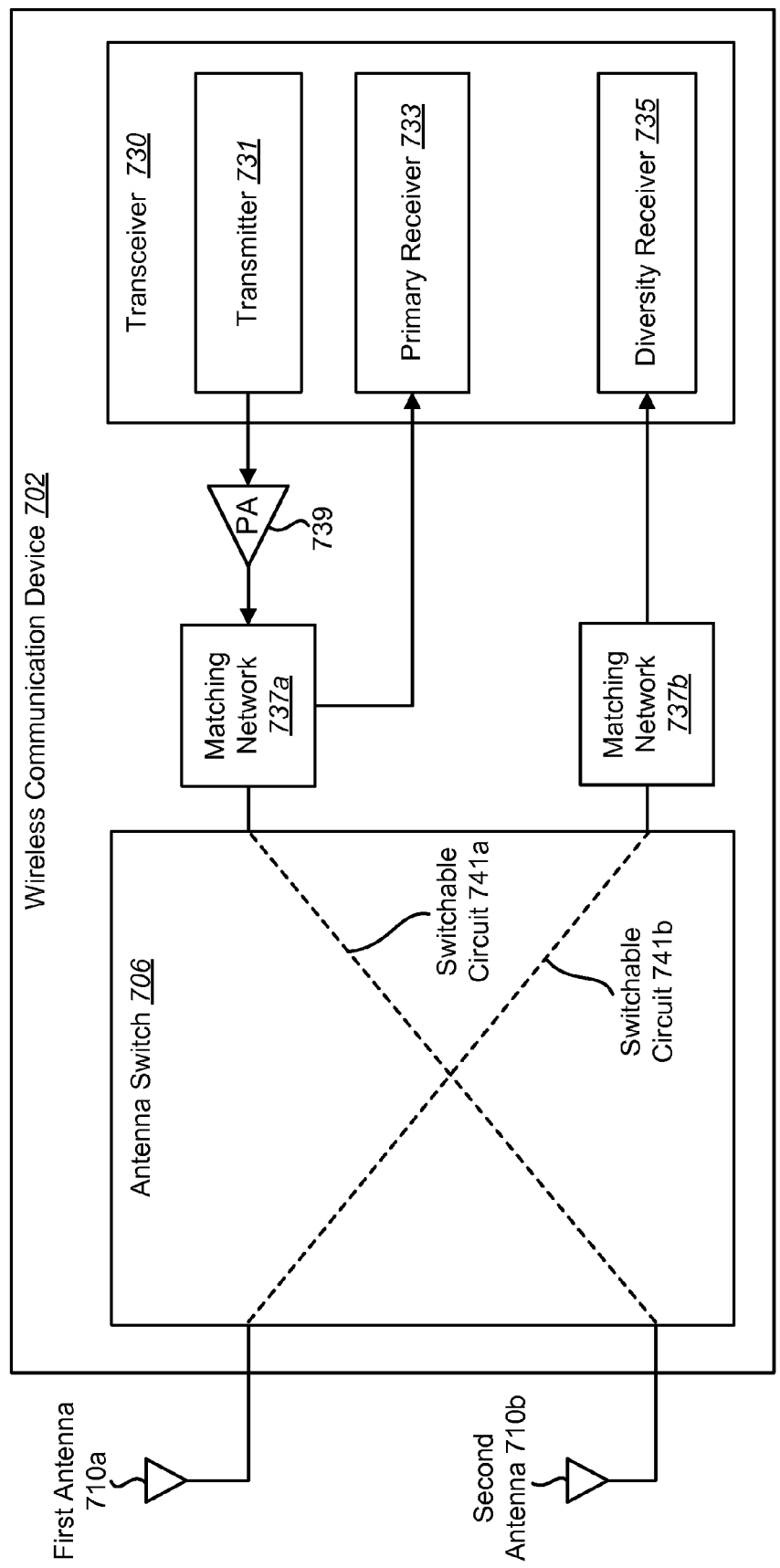
FIG. 7 is a block diagram illustrating a type 1 antenna switch of a wireless communication device.

FIG. 7 is a block diagram illustrating a type 1 antenna switch 706 of a wireless communication device 702. In this configuration, the wireless communication device 702 includes a first antenna 710a (e.g., primary antenna) and a second antenna 710b (e.g., diversity antenna) that are coupled to an antenna switch 706. A first matching network 737a is coupled to a first switchable circuit 741a that may be switched to either the first antenna 710a or the second antenna 710b. A second matching network 737b is coupled to a second switchable circuit 741b that may be switched to either the first antenna 710a or the second antenna 710b. Therefore, in this configuration, the first antenna 710a and the second antenna 710b can be switched.

The wireless communication device 702 also includes a transceiver 730. In one configuration, the transceiver 730 includes a transmitter 731, a primary receiver (PRx) 733 and a diversity receiver (DRx) 735. The transmitter 731 is coupled to the first matching network 737a via a power amplifier (PA) 739. The primary receiver 733 is also coupled to the matching network 737. The diversity receiver 735 is coupled to the second matching network 737b.

Probing may be conducted continuously because the RX diversity is always on. Hence, antenna 710 switching may be triggered by the RSRP delta 536 being greater than the RSRP high threshold 540. Antenna 710 switching may also be triggered by the RSRP delta average 538 being greater than the RSRP low threshold 542. Antenna 710 switching can further be triggered when the combined MTPL counter 544 for the previous decision period 524 is greater than an MTPL switching threshold 522 (given that both the first antenna RSRP 512a and the second antenna RSRP 512b are above an MTPL gating threshold).

If the RSRP 512 on the switched-to antenna 710 is worse than the RSRP 512 of the previous antenna, a switchback to the previous antenna 710 may be triggered. In one configuration, a switchback can be triggered by a transmit power control (TPC) command that causes the TX power 514 for the switched-to antenna 510 to rise above a switchback power threshold 548 (e.g., 10 dB). For example, the wireless communication device 702 may switchback to the first antenna 710a if a TPC command causes the TX power 514 for the second antenna 710b to rise above the switchback power threshold 548.

A switchback may also be triggered if the MTPL count on the switched-to antenna 510 being greater than the MTPL count on the previous antenna 510 plus a switchback MTPL threshold 548. If both of these conditions are true, the switchback may be triggered by the power difference.

Figure 8:
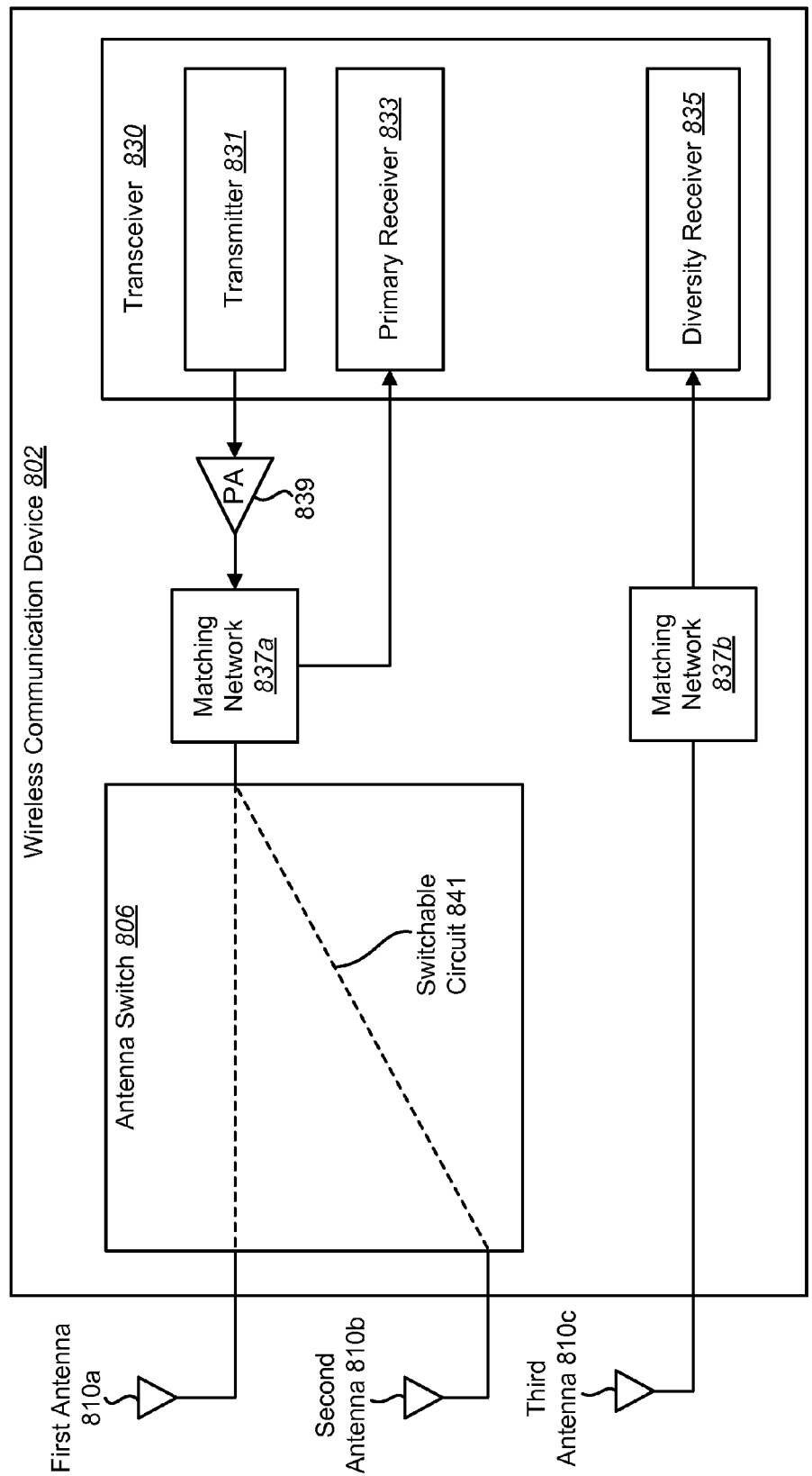
FIG. 8 is a block diagram illustrating a type 2 antenna switch of a wireless communication device.

FIG. 8 is a block diagram illustrating a type 2 antenna switch 806 of a wireless communication device 802. In this configuration, the wireless communication device 802 includes a first antenna 810a (e.g., primary antenna) and a second antenna 810b (e.g., diversity antenna) that are coupled to an antenna switch 806. A first matching network 837a is coupled to a switchable circuit 841 that may be switched to either the first antenna 810a or the second antenna 810b. Therefore, in this configuration, the first antenna 810a and the second antenna 810b can be switched. A third antenna 810c may be coupled to a second matching network 837b.

The wireless communication device 802 also includes a transceiver 830. In one configuration, the transceiver 830 includes a transmitter 831, a primary receiver (PRx) 833 and a diversity receiver (DRx) 835. The transmitter 831 is coupled to the first matching network 837a via a power amplifier (PA) 839. The primary receiver 833 is also coupled to the matching network 837. The diversity receiver 835 is coupled to the second matching network 837b.

In the type 2 antenna switch 806, only the primary receiver 833 and the transmitter 831 (PRX/TX) can switch between the first antenna 810a and the second antenna 810b. Thus, the type 2 antenna switch 806 may first decide whether to switch and then may decide whether to stay on the new antenna 810 or switch back. Since there is no guarantee that the new antenna 810 is better, the criteria to trigger the switch may be conservatively designed.

In one configuration, the antenna switch 806 can look back at the primary RSRP (e.g., the RSRP 512 associated with the first antenna 810a). When the primary RSRP 512 measured over a period of 8 decision periods 524 (approximately 5 seconds) has dropped persistently by the RSRP high threshold 540, an antenna 810 switch may be triggered.

In another configuration, the antenna switch 806 can compare the difference between the primary RSRP and the secondary RSRP (e.g., the RSRP 512 associated with the second antenna 810b). When the difference between the primary RSRP and the secondary RSRP is greater than a threshold, an antenna 810 switch may be triggered. In another configuration, an antenna 810 switch can be triggered when the RSRP 512a measured on the first antenna 810a is lower than a threshold.

In yet another configuration, an antenna 810 switch can be triggered when the combined MTPL counter 544 (e.g., the combination of the PUSCH MTPL counter 518 and PUCCH MTPL counter 520) for the previous 640 ms is greater than 50% (e.g., 320) (given that both the primary RSRP and the secondary RSRP are above an MTPL gating threshold).

After an antenna 810 switch, there may be three conditions that trigger a switchback to the previous antenna 810. A switchback may be triggered if the RSRP delta 536 drops by more than the RSRP high threshold 540 on the new antenna 810. For example, the wireless communication device 802 may switch back to the first antenna 810a if the RSRP delta 536 drops by more than an RSRP high threshold 540 on the second antenna 810b.

A switchback may also be triggered if the TPC commands cause the TX power 514 to rise above the switchback power threshold 546. A switchback may further be triggered if the combined MTPL counter 544 on the new antenna (for both the PUSCH and the PUCCH) is greater than the combined MTPL counter 544 on the previous antenna 810 by a switchback MTPL threshold 548. If all these conditions are true, the switchback may be triggered by the power difference.

Figure 9:
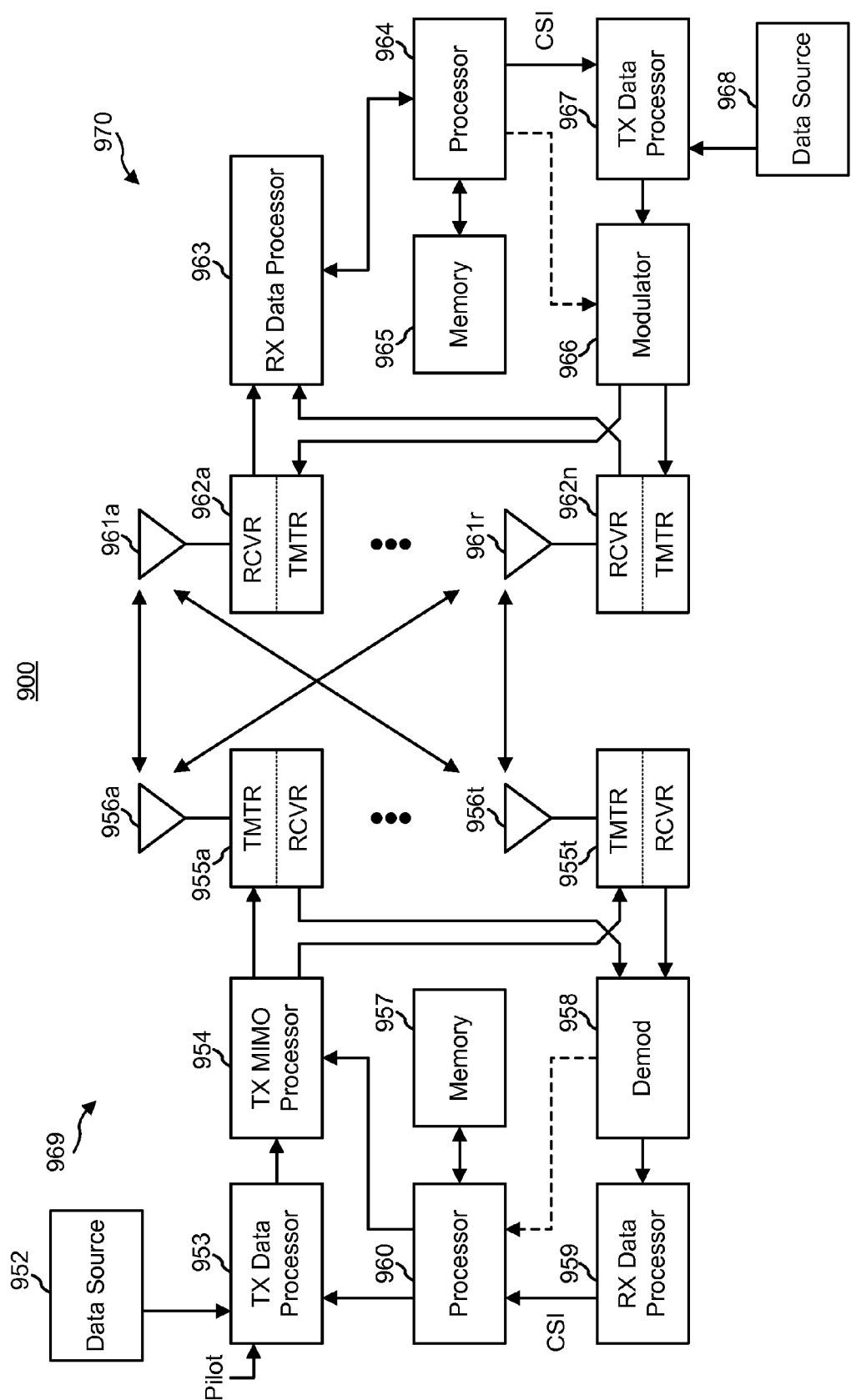
FIG. 9 is a block diagram of a transmitter and receiver in a multiple-input and multiple-output (MIMO) system.

FIG. 9 is a block diagram of a transmitter 969 and receiver 970 in a multiple-input and multiple-output (MIMO) system 900. In the transmitter 969, traffic data for a number of data streams is provided from a data source 952 to a transmit (TX) data processor 953. Each data stream may then be transmitted over a respective transmit antenna 956a through 956t. The TX data processor 953 may format, code, and interleave the traffic data for each data stream based on a particular coding scheme selected for that data stream to provide coded data.

A MIMO system 900 may employ multiple ($N_T$) transmit antennas 956 and multiple ($N_R$) receive antennas 961 for data transmission. A MIMO channel formed by the $N_T$ transmit antennas 956 and $N_R$ receive antennas 961 may be decomposed into $N_S$ independent channels, which are also referred to as spatial channels. The $N_S$ independent channels may be less than or equal to $\min\{N_T, N_R\}$. Each of the $N_S$ independent channels corresponds to a dimension. The MIMO system 900 may provide improved performance (e.g., higher throughput and greater reliability) if the additional dimensionalities created by the multiple transmit antennas 956 and receive antennas 961 are utilized.

A MIMO system 900 may support time division duplex (TDD) and frequency division duplex (FDD) systems. In a TDD system, the uplink and downlink transmissions are on the same frequency region so that the reciprocity principle allows the estimation of the downlink channel from the uplink channel. This enables the base station 104 to extract transmit beamforming gain on the downlink when multiple antennas are available at the base station 104.

In one configuration, each data stream is transmitted over a respective transmit antenna 956. The TX data processor 953 formats, codes, and interleaves the traffic data for each data stream based on a particular coding scheme selected for that data stream to provide coded data.

The coded data for each data stream may be multiplexed with pilot data using OFDM techniques. The pilot data may be a known data pattern that is processed in a known manner and used at the receiver 970 to estimate the channel response. The multiplexed pilot and coded data for each stream is then modulated (i.e., symbol mapped) based on a particular modulation scheme (e.g., binary phase shift keying (BPSK), quadrature phase shift keying (QPSK), multiple phase shift keying (M-PSK) or multi-level quadrature amplitude modulation (M-QAM)) selected for that data stream to provide modulation symbols. The data rate, coding and modulation for each data stream may be determined by instructions performed by a processor.

The modulation symbols for all data streams may be provided to a TX MIMO processor 954, which may further process the modulation symbols (e.g., for OFDM). The TX MIMO processor 954 then provides $N_T$ modulation symbol streams to $N_T$ transmitters (TMTR) 955a through 955t. The TX MIMO processor 954 may apply beamforming weights to the symbols of the data streams and to the antenna 956 from which the symbol is being transmitted.

Each transmitter 955 may receive and process a respective symbol stream to provide one or more analog signals, and further condition (e.g., amplify, filter and upconvert) the analog signals to provide a modulated signal suitable for transmission over the MIMO channel. $N_T$ modulated signals from transmitters 955a through 955t are then transmitted from $N_T$ antennas 956a through 956t, respectively.

At the receiver 970, the transmitted modulated signals are received by $N_R$ antennas 961a through 961r and the received signal from each antenna 961 is provided to a respective receiver (RCVR) 962a through 962n. Each receiver 962 may condition (e.g., filter, amplify and downconvert) a respective received signal, digitize the conditioned signal to provide samples, and further process the samples to provide a corresponding "received" symbol stream.

An RX data processor 963 then receives and processes the $N_R$ received symbol streams from $N_R$ receivers 962 based on a particular receiver processing technique to provide $N_T$ "detected" symbol streams. The RX data processor 963 then demodulates, deinterleaves and decodes each detected symbol stream to recover the traffic data for the data stream. The processing by RX data processor 963 is complementary to that performed by TX MIMO processor 954 and TX data processor 953 at transmitter system 969.

A processor 964 may periodically determine which precoding matrix to use. The processor 964 may store information on and retrieve information from memory 965. The processor 964 formulates a reverse link message comprising a matrix index portion and a rank value portion. The reverse link message may be referred to as channel state information (CSI). The reverse link message may comprise various types of information regarding the communication link and/or the received data stream. The reverse link message is then processed by a TX data processor 967, which also receives traffic data for a number of data streams from a data source 968, modulated by a modulator 966, conditioned by transmitters 962a through 962n, and transmitted back to the transmitter 969.

At the transmitter 969, the modulated signals from the receiver are received by antennas 956, conditioned by receivers 955, demodulated by a demodulator 958, and processed by an RX data processor 959 to extract the reverse link message transmitted by the receiver system 970. A processor 960 may receive channel state information (CSI) from the RX data processor 959. The processor 960 may store information on and retrieve information from memory 957. The processor 960 then determines which pre-coding matrix to use for determining the beamforming weights and then processes the extracted message.

Figure 10:
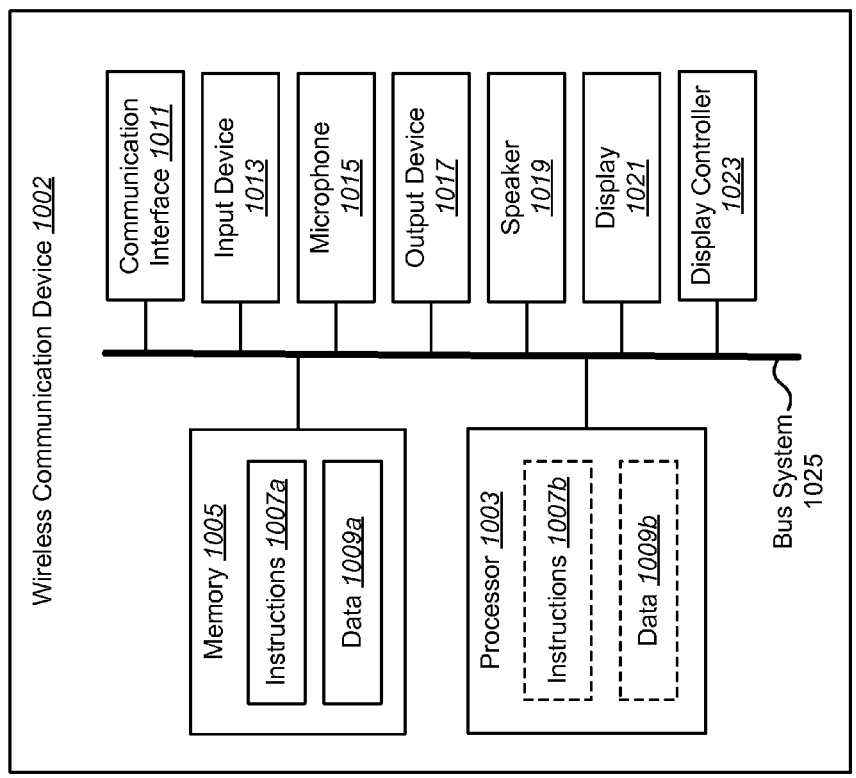
FIG. 10 illustrates various components that may be utilized in a wireless communication device.

FIG. 10 illustrates various components that may be utilized in a wireless communication device 1002. The illustrated components may be located within the same physical structure or in separate housings or structures. The wireless communication device 1002 described in connection with FIG. 10 may be implemented in accordance with one or more of the wireless communication devices 102, 502, 702, 802 described herein.

The wireless communication device 1002 includes a processor 1003. The processor 1003 may be a general purpose single- or multi-chip microprocessor (e.g., an advanced RISC machine (ARM)), a special purpose microprocessor (e.g., a digital signal processor (DSP)), a microcontroller, a programmable gate array, etc. The processor 1003 may be referred to as a central processing unit (CPU). Although just a single processor 1003 is shown in the wireless communication device 1002 of FIG. 10, in an alternative configuration, a combination of processors 1003 (e.g., an ARM and DSP) could be used.

The wireless communication device 1002 also includes memory 1005 in electronic communication with the processor 1003. That is, the processor 1003 may read information from and/or write information to the memory 1005. The memory 1005 may be any electronic component capable of storing electronic information. The memory 1005 may be random access memory (RAM), read-only memory (ROM), magnetic disk storage media, optical storage media, flash memory devices in RAM, on-board memory included with the processor 1003, programmable read-only memory (PROM), erasable programmable read-only memory (EPROM), electrically erasable PROM (EEPROM), registers, and so forth, including combinations thereof.

Data 1009a and instructions 1007a may be stored in the memory 1005. The instructions 1007a may include one or more programs, routines, sub-routines, functions, procedures, etc. The instructions may include a single computer-readable statement or many computer-readable statements. The instructions 1007a may be executable by the processor 1003 to implement one or more of the methods, functions and procedures described above. Executing the instructions may involve the use of the data 1009a that is stored in the memory 1005. FIG. 10 shows some instructions 1007b and data 1009b being loaded into the processor 1003 (which may come from instructions 1007a and data 1009a that are stored in the memory 1005).

The wireless communication device 1002 may also include one or more communication interfaces 1011 for communicating with other wireless communication devices. The communication interfaces 1011 may be based on wired communication technology, wireless communication technology, or both. Examples of different types of communication interfaces 1011 include a serial port, a parallel port, a Universal Serial Bus (USB), an Ethernet adapter, an Institute of Electrical and Electronics Engineers (IEEE) 1394 bus interface, a near-field communication (NFC) transceiver, a small computer system interface (SCSI) bus interface, an infrared (IR) communication port, a Bluetooth wireless communication adapter, a 3rd Generation Partnership Project (3GPP) transceiver, an IEEE 802.11 ("Wi-Fi") transceiver and so forth. For example, the communication interface 1011 may be coupled to one or more antennas (not shown) for transmitting and receiving wireless signals.

The wireless communication device 1002 may also include one or more input devices 1013 and one or more output devices 1017. Examples of different kinds of input devices 1013 include a keyboard, mouse, microphone 1015, remote control device, button, joystick, trackball, touchpad, lightpen, etc. For instance, the wireless communication device 1002 may include one or more microphones 1015 for capturing acoustic signals. In one configuration, a microphone 1015 may be a transducer that converts acoustic signals (e.g., voice, speech) into electrical or electronic signals. Examples of different kinds of output devices 1017 include a speaker 1019, printer, etc. For instance, the wireless communication device 1002 may include one or more speakers 1019. In one configuration, a speaker 1019 may be a transducer that converts electrical or electronic signals into acoustic signals. One specific type of output device 1017 that may be typically included in a wireless communication device 1002 is a display 1021 device. Display 1021 devices used with configurations disclosed herein may utilize any suitable image projection technology, such as a cathode ray tube (CRT), liquid crystal display (LCD), light-emitting diode (LED), gas plasma, electroluminescence, or the like. A display controller 1023 may also be provided, for converting data stored in the memory 1005 into text, graphics, and/or moving images (as appropriate) shown on the display 1021 device.

The various components of the wireless communication device 1002 may be coupled together by one or more buses, which may include a power bus, a control signal bus, a status signal bus, a data bus, etc. For simplicity, the various buses are illustrated in FIG. 10 as a bus system 1025. It should be noted that FIG. 10 illustrates only one possible configuration of a wireless communication device 1002. Various other architectures and components may be utilized.

In the above description, reference numbers have sometimes been used in connection with various terms. Where a term is used in connection with a reference number, this may be meant to refer to a specific element that is shown in one or more of the Figures. Where a term is used without a reference number, this may be meant to refer generally to the term without limitation to any particular Figure.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a digital signal processor (DSP) and a microprocessor, a plurality of microprocessors, one or more microprocessors in conjunction with a digital signal processor (DSP) core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may comprise a single computer-readable statement or many computer-readable statements.

The functions described herein may be implemented in software or firmware being executed by hardware. The functions may be stored as one or more instructions on a computer-readable medium. The terms "computer-readable medium" or "computer-program product" refers to any tangible storage medium that can be accessed by a computer or a processor. By way of example, and not limitation, a computer-readable medium may include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers. It should be noted that a computer-readable medium may be tangible and non-transitory. The term "computer-program product" refers to a computing device or processor in combination with code or instructions (e.g., a "program") that may be executed, processed or computed by the computing device or processor. As used herein, the term "code" may refer to software, instructions, code or data that is/are executable by a computing device or processor.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

Further, it should be appreciated that modules and/or other appropriate means for performing the methods and techniques described herein, such as those illustrated by FIG. 2, FIG. 3, FIG. 4 and FIG. 6 can be downloaded and/or otherwise obtained by a device. For example, a device may be coupled to a server to facilitate the transfer of means for performing the methods described herein. Alternatively, various methods described herein can be provided via a storage means (e.g., random access memory (RAM), read only memory (ROM), a physical storage medium such as a compact disc (CD) or floppy disk, etc.), such that a device may obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A method for antenna switching, comprising:
   transmitting using a first antenna;
   determining that a trigger occurs to switch to transmitting using a second antenna, wherein the trigger is based on a combination of a physical uplink shared channel (PUSCH) maximum transmit power level (MTPL) counter and a physical uplink control channel (PUCCH) MTPL counter; and
   switching to transmitting using the second antenna based on the determination.

2. The method of claim 1, wherein the trigger occurs when a ratio of the combined MTPL counters over a total number of uplink subframes within a decision period is greater than a MTPL switching threshold.

3. The method of claim 2, wherein the decision period comprises approximately 640 ms and wherein the MTPL switching threshold is approximately 50%.

4. The method of claim 1, wherein the PUSCH MTPL counter is incremented when transmit (TX) power of a PUSCH subframe is greater than or equal to the MTPL, and the PUSCH MTPL counter is incremented when TX power of a PUCCH subframe is greater than or equal to the MTPL.

5. The method of claim 1, wherein the trigger occurs when a reference signal received power (RSRP) of the first antenna and a RSRP of the second antenna are both greater than a MTPL gating threshold.

6. The method of claim 1, wherein an antenna switch switches between the first antenna and the second antenna.

7. The method of claim 6, wherein the antenna switch is a type 1 antenna switch where both a primary receiver and a diversity receiver can be switched.

8. The method of claim 6, wherein the antenna switch is a type 2 antenna switch where only a primary receiver and a transmitter can switch between two antennas.

9. The method of claim 1, wherein the trigger is also based on a reference signal received power (RSRP).

10. The method of claim 9, further comprising performing a switchback to the first antenna if a RSRP delta drops by more than a RSRP high threshold on the second antenna.

11. The method of claim 1, further comprising performing a switchback to the first antenna when a transmit power control (TPC) command causes the transmit (TX) power for the second antenna to rise above a switchback power threshold.

12. The method of claim 11, wherein the switchback power threshold is approximately 10 decibels.

13. The method of claim 1, further comprising performing a switchback to the first antenna if a MTPL count on the second antenna is greater than the MTPL count of the first antenna plus a switchback MTPL threshold.

14. The method of claim 13, wherein the switchback MTPL threshold is approximately 30%.

15. A wireless communication device for antenna switching, comprising:
   a processor;
   memory in electronic communication with the processor; and
   instructions stored in the memory, the instructions being executable by the processor to:
      transmit using a first antenna;
      determine that a trigger occurs to switch to transmitting using a second antenna, wherein the trigger is based on a combination of a physical uplink shared channel (PUSCH) maximum transmit power level (MTPL) counter and a physical uplink control channel (PUCCH) MTPL counter; and
      switch to transmitting using the second antenna based on the determination.

16. The wireless communication device of claim 15, wherein the trigger occurs when a ratio of the combined MTPL counters over a total number of uplink subframes within a decision period is greater than a MTPL switching threshold.

17. The wireless communication device of claim 16, wherein the PUSCH MTPL counter is incremented when transmit (TX) power of a PUSCH subframe is greater than or equal to the MTPL, and the PUSCH MTPL counter is incremented when TX power of a PUCCH subframe is greater than or equal to the MTPL.

18. The wireless communication device of claim 16, wherein an antenna switch switches between the first antenna and the second antenna.

19. The wireless communication device of claim 16, further comprising instructions executable to perform a switchback to the first antenna when a transmit power control (TPC) command causes the transmit (TX) power for the second antenna to rise above a switchback power threshold.

20. The wireless communication device of claim 16, further comprising instructions executable to perform a switchback to the first antenna if a MTPL count on the second antenna is greater than the MTPL count of the first antenna plus a switchback MTPL threshold.

21. An apparatus for antenna switching, comprising:
   means for transmitting using a first antenna;
   means for determining that a trigger occurs to switch to transmitting using a second antenna, wherein the trigger is based on a combination of a physical uplink shared channel (PUSCH) maximum transmit power level (MTPL) counter and a physical uplink control channel (PUCCH) MTPL counter; and
   means for switch to transmitting using the second antenna based on the determination.

22. The apparatus of claim 21, wherein the trigger occurs when a ratio of the combined MTPL counters over a total number of uplink subframes within a decision period is greater than a MTPL switching threshold.

23. The apparatus of claim 21, wherein the PUSCH MTPL counter is incremented when transmit (TX) power of a PUSCH subframe is greater than or equal to the MTPL, and the PUSCH MTPL counter is incremented when TX power of a PUCCH subframe is greater than or equal to the MTPL.

24. The apparatus of claim 21, further comprising means for performing a switchback to the first antenna if a transmit power control (TPC) command causes the transmit (TX) power for the second antenna to rise above a switchback power threshold.

25. The apparatus of claim 21, further comprising means for performing a switchback to the first antenna if a MTPL count on the second antenna is greater than the MTPL count of the first antenna plus a switchback MTPL threshold.

26. A computer-program product for antenna switching, the computer-program product comprising a non-transitory computer-readable medium having instructions thereon, the instructions comprising:
   code for causing a wireless communication device to transmit using a first antenna;
   code for causing the wireless communication device to determine that a trigger occurs to switch to transmitting using a second antenna, wherein the trigger is based on a combination of a physical uplink shared channel (PUSCH) maximum transmit power level (MTPL) counter and a physical uplink control channel (PUCCH) MTPL counter; and code for causing the wireless communication device to switch to transmitting using the second antenna based on the determination.

27. The computer-program product of claim 26, wherein the trigger occurs when a ratio of the combined MTPL counters over a total number of uplink subframes within a decision period is greater than a MTPL switching threshold.

28. The computer-program product of claim 26, wherein the PUSCH MTPL counter is incremented when transmit (TX) power of a PUSCH subframe is greater than or equal to the MTPL, and the PUSCH MTPL counter is incremented when TX power of a PUCCH subframe is greater than or equal to the MTPL.

29. The computer-program product of claim 26, further comprising code for causing the wireless communication device to perform a switchback to the first antenna if a transmit power control (TPC) command causes the transmit (TX) power for the second antenna to rise above a switchback power threshold.

30. The computer-program product of claim 26, further comprising code for causing the wireless communication device to perform a switchback to the first antenna if a MTPL count on the second antenna is greater than the MTPL count of the first antenna plus a switchback MTPL threshold.

* * * * *